Figure 1:
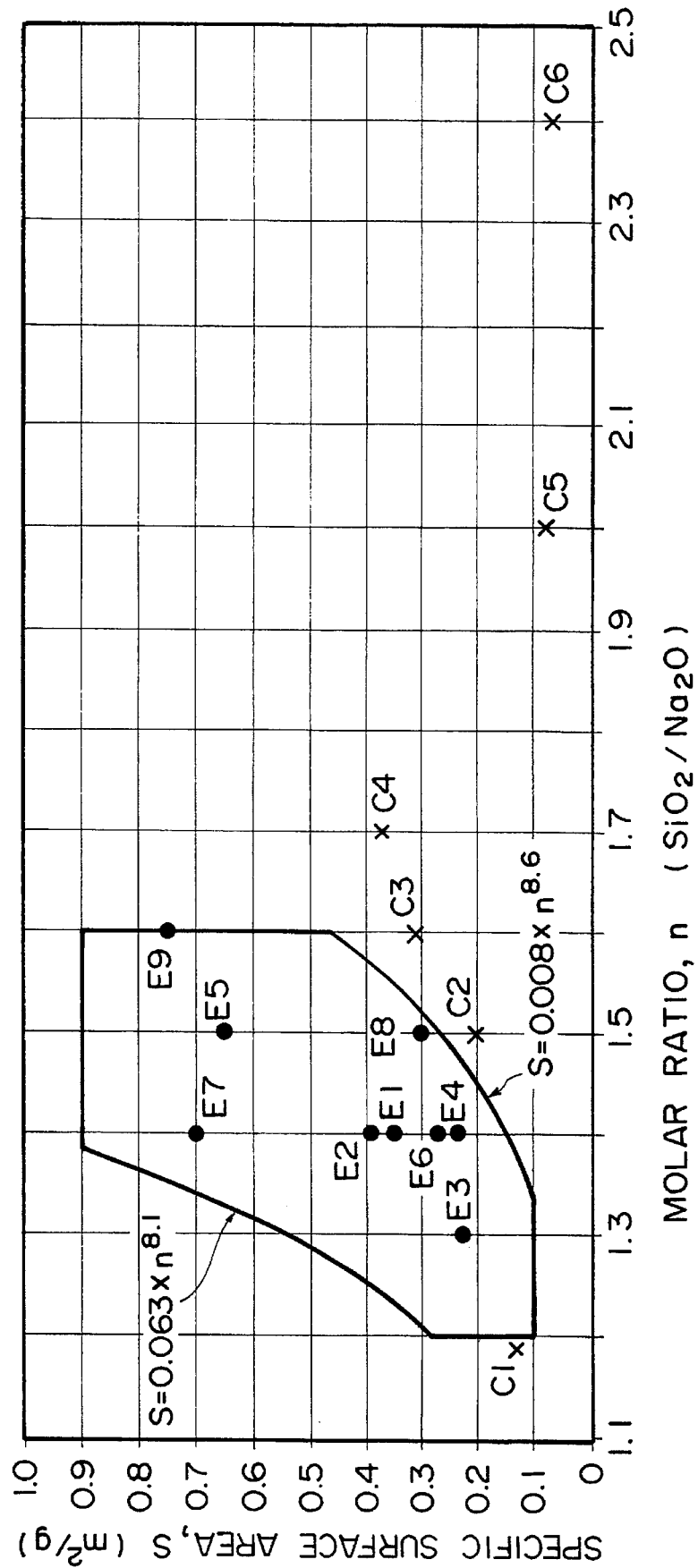

United States Patent
Fukuyama et al.

[11] Patent Number: 5,510,096
[45] Date of Patent: Apr. 23, 1996

[54] AMORPHOUS SODIUM SILICATE POWDER

[75] Inventors: Yoshiki Fukuyama; Genji Taga, both of Shinnanyo, Japan

[73] Assignee: Tokuyama Corporation, Yamaguchi, Japan

[21] Appl. No.: 501,363

[22] Filed: Jul. 12, 1995

[30] Foreign Application Priority Data

Jul. 14, 1994 [JP] Japan ............................ 6-161867

[51] Int. Cl.[6] .................................................. C01B 33/32
[52] U.S. Cl. .................................... 423/332; 252/135
[58] Field of Search .................... 423/332; 23/313 AS; 252/135

[56] References Cited

U.S. PATENT DOCUMENTS

| | | | |
|---|---|---|---|
| 3,687,640 | 8/1972 | Sams et al. | 23/313 |
| 3,748,103 | 7/1973 | Bean et al. | 23/313 |
| 3,782,906 | 1/1974 | Pierce | 23/313 |
| 3,918,921 | 11/1975 | Pierce | 23/313 AS |
| 4,367,073 | 1/1983 | Just | 23/302 T |
| 4,676,953 | 6/1987 | Jeromin et al. | 422/106 |
| 5,286,470 | 2/1994 | Delwel | 423/332 |
| 5,338,528 | 8/1994 | Sorensson et al. | 423/333 |
| 5,340,559 | 8/1994 | Delwel et al. | 423/334 |
| 5,344,633 | 9/1994 | Sorensson et al. | 423/333 |
| 5,393,507 | 2/1995 | Theunissen et al. | 223/332 |

FOREIGN PATENT DOCUMENTS

| | | |
|---|---|---|
| 2135261 | 12/1972 | France . |
| 2157943 | 6/1973 | France . |
| 4400024 | 7/1995 | Germany . |
| 170320 | 7/1991 | Japan . |

Primary Examiner—Michael Lewis
Assistant Examiner—Amy M. Harding
Attorney, Agent, or Firm—Wenderoth, Lind & Ponack

[57] ABSTRACT

Amorphous sodium silicate powder exhibiting excellent water softening power and suitable as a detergent builder is provided. This amorphous sodium silicate powder is characterized in that when the molar ratio of $SiO_2/Na_2O$ is expressed by n and the specific surface area thereof is expressed by $S(m^2/g)$, the following expressions:

$1.20 \leq n \leq 1.60$
$0.10 \leq S \leq 0.90$
and
$0.008 \times n^{8.6} \leq S \leq 0.063 \times n^{8.1}$ are satisfied.

10 Claims, 2 Drawing Sheets

E: Example
C: Comparative Example

AMORPHOUS SODIUM SILICATE POWDER

This invention relates to amorphous sodium silicate powder which has water softening power and is useful as a detergent builder, and a process for preparation thereof.

Amorphous sodium silicate powder has been known from long ago. Amorphous sodium silicate cullet (sodium silicate glass pieces) as a representative example thereof is obtained by heat fusing siliceous sand, and sodium carbonate or sodium hydroxide, and its molar ratio n of $SiO_2/Na_2O$ is, usually 2 to 3.3. Water glass solution comprising amorphous sodium silicate cullet having been dissolved in water under high pressure is a material having the most comprehensive uses in all the manufacturing industries, but amorphous sodium silicate cullet itself strongly tends to be used as an intermediate product, and there is no report about amorphous sodium silicate cullet useful as a detergent builder.

As to amorphous sodium silicate powder usable as a detergent builder, a process for producing amorphous sodium silicate is disclosed in Japanese Laid-open Patent Publication No. 170320/1991. Amorphous sodium silicate powder according to this official bulletin is obtained by reacting siliceous sand with an aqueous sodium hydroxide solution to give a water glass solution, spraying and drying the solution, and heating and burning the dried matter at temperatures of 250° C. or more up to 500° C., and grinding the dried matter. However, as to this process, there is a problem that there are many production steps of 4, and further, the resultant amorphous sodium silicate powder having the molar ratio of $SiO_2/Na_2O$ of 1.9 to 2.8 has only small water softening power.

Thus, the object of the present invention lies in providing amorphous sodium silicate powder having large water softening power, and providing a process for producing this amorphous sodium silicate powder by simplified steps.

The present inventors have engaged in production of sodium silicate cullet from long ago, and have made sequential researches into the production and physical and chemical properties of sodium silicate cullet. As a result, the present inventors found that the water softening power of amorphous sodium silicate cullet becomes large when the molar ratio and specific surface area of the amorphous sodium silicate cullet satisfy specific relations.

Thus, according to the present invention, there is provided amorphous sodium silicate powder wherein, when the molar ratio of $SiO_2/Na_2O$ is expressed by n and the specific surface area thereof is expressed by $S(m^2/g)$, the following expressions:

$1.20 \leq n \leq 1.60$ $0.10 \leq S \leq 0.90$ and $0.008 \times n^{8.6} \leq S \leq 0.063 \times n^{8.1}$ are satisfied.

The present inventors surmise that when sodium silicate powder is dissolved in water, Na ions are first eluted, and silicate ions are then eluted. The present inventors further surmise that water softening by sodium silicate powder is caused by that the concentrations of Ca ions and Mg ions in the water are lowered as follows;

Ca ions: Ca ions bind to silicic acid remaining without being dissolved after elution of Na ions.

Mg ions: Silicate ions eluted and Mg ions form a precipitate of magnesium silicate.

Incidentally, it is known that Mg ions bind to $OH^-$ ions in the solution to form a precipitate of magnesium hydroxide and thereby their concentration is decreased, and Mg ion concentration in water is much less than Ca ion concentration. Thus, the present inventors considered that if sodium silicate capable of binding to more Ca ions had been prepared, it would have larger water softening power. Namely, the point lies in increasing the binding sites for Ca ions in silicic acid by making the amount of Na ions eluted from sodium silicate larger, and further inhibiting dissolution of silicate ions.

Therefore, when the molar ratio of $SiO_2/Na_2O$ in the amorphous sodium silicate powder of the present invention is expressed by n,n must satisfy the following expression:

$1.20 \leq n \leq 1.60$

When n is smaller than 1.20, dissolution of silicate ions in the amorphous sodium silicate powder becomes faster, and Ca ions once bound to silicic acid are eluted again into water, which results in making its water softening power poor, and such a case is not desirable. On the other hand, when n is larger than 1.60, the amount of Na ions eluted decreases and sites to which Ca ions bind decrease, and as a result, water softening power becomes, undesirably, smaller. When further excellent water softening power is desired, it is preferred that n satisfies $1.30 \leq n \leq 1.50$. The solubilities of Na ions and silicate ions in amorphous sodium silicate powder are also influenced by its specific surface area. In the present invention, when the specific surface area of the amorphous sodium silicate powder is expressed by $S(m^2/g)$, S must satisfy the following expression:

$0.10 \leq S \leq 0.90$

When S is smaller than 0.10 $m^2/g$, the amount of Na ions eluted decreases, and water softening power, undesirably, lowers. On the other hand, when the specific surface area is larger than 0.90 $m^2/g$, the dissolution of silicate ions as well as the elution of Na ions becomes faster, and thereby water softening power becomes, undesirably, poor, as is the case where the above molar ratio n is low. Further, it is very difficult to make the specific surface area larger than 0.90 $m^2/g$ by a general grinding method. When further excellent water softening power is desired, it is preferred that S satisfies $0.20 \leq S \leq 0.80$.

Further, in order to obtain amorphous sodium silicate powder having excellent water softening power, the molar ratio n of $SiO_2/Na_2O$ in the amorphous sodium silicate powder and the specific surface area S thereof satisfy a specific relation. Namely, the molar ratio n of $SiO_2/Na_2O$ and the specific surface area S satisfy the following expression:

$0.008 \times n^{8.6} \leq S \leq 0.063 \times n^{8.1}$

When the specific surface area S is smaller than $0.008 \times n^{8.6}$, the amount of Na ions eluted decreases, and water softening power, undesirably, lowers. On the other hand, when the specific surface area S is larger than $0.063 \times n^{8.1}$, the dissolution of silicate ions as well as the elution of Na ions becomes faster, and thereby water softening power becomes, undesirably, poor. Namely, it is surmised that when the molar ratio of $SiO_2/Na_2O$ and the specific surface area satisfy the above relation, the amount of binding sites for Ca ions on the silicic acid existing in a solid state after the elution of Na ions becomes large.

In order that the amorphous sodium silicate powder exhibits further excellent water softening power, the above molar ratio n and the specific surface area S, preferably, satisfy the following expression:

$0.008 \times n^{9.6} \leq S \leq 0.045 \times n^{8.2}$, and, more preferably, satisfy the following expression:

$0.009 \times n^{9.7} \leq S \leq 0.037 \times n^{8.3}$

Figure 2:
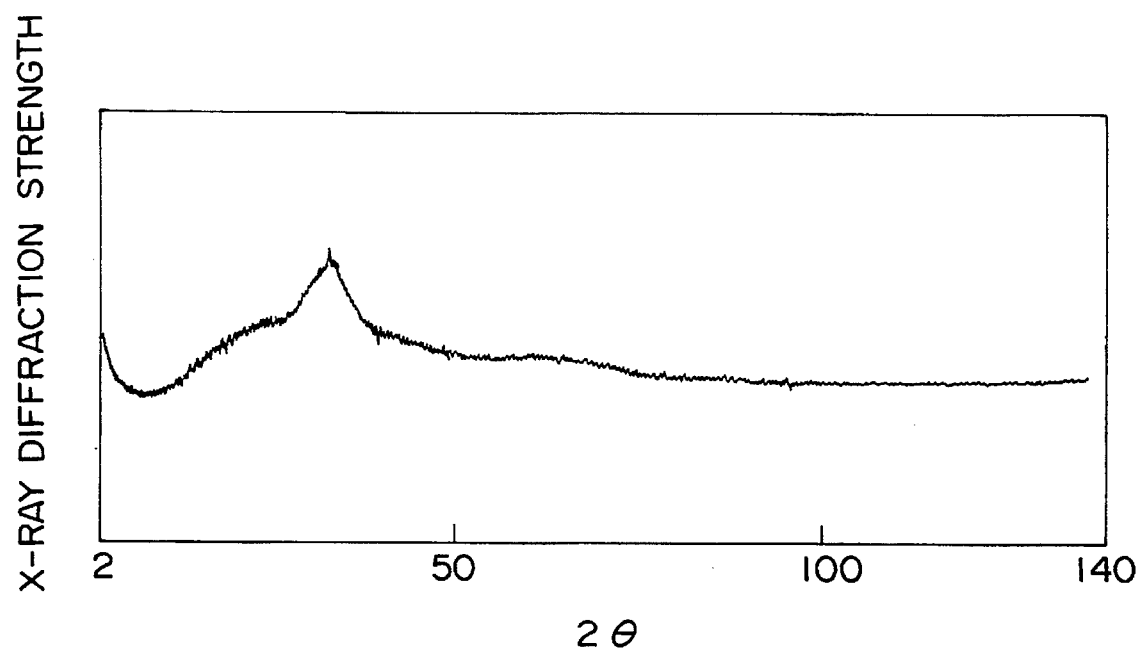

In the attached drawings,

FIG. 1 is a graph showing the relation between the molar ratio n and the specific surface area S of amorphous sodium silicate powders obtained in the later-described Examples and Comparative examples, and FIG. 2 is the X-ray diffraction pattern of the amorphous sodium silicate powder obtained in Example 1.

The inner part of the thick lines is a region where the molar ratio n and the specific surface area S have a relation to satisfy all the above expressions.

The amorphous sodium silicate powder of the present invention is amorphous. However, this includes not only the case where it is perfectly amorphous but the case where an extremely slight amount of fine crystals are contained. This can be explained based on FIG. 2. In FIG. 2, a broad peak is observed around $2\theta=33°$. This broad peak is due to fine crystals slightly contained in the amorphous matter. The amount of the fine crystals can be calculated from the area of the broad peak in the halo pattern in comparison with the halo pattern and the particle size of the fine crystals from the half width of the broad peak. In this drawing, the fine crystals amount calculated from the area of the broad peak in the halo pattern in comparison with the halo pattern is 13% by volume, and the particle size of the fine crystals calculated from the half width of the broad peak according to the Scherrer's expression is 1.6 nm.

The term "amorphous" in the present invention includes the case where an extremely slight amount of fine crystals is contained in the amorphous matter. In order to be amorphous, it is, in general, preferred that the amount of the fine crystals calculated from the area of the broad peak in the halo pattern in comparison with the halo pattern is 20% by volume or less, and it is preferred that the particle size of the fine crystals calculated from the half width of the broad peak is 5 nm or less.

In the amorphous sodium silicate powder of the present invention, its average primary particle size calculated from the specific surface area is 2.7 to 24 μm, preferably 3.0 to 12 μm, and its average secondary particle size measured using a particle size distribution analyzer based on liquid-phase dispersive sedimentation in which the measurement is taken by the optical transmission method is 4.5 to 45 μm, preferably 5.2 to 22 μm.

The amorphous sodium silicate of the present invention can be produced by any process, but a process which comprises grinding sodium silicate cullet wherein the molar ratio n of $SiO_2/Na_2O$ is $1.20 \leq n \leq 1.60$ is simple and preferred.

In this process, sodium silicate cullet wherein the molar ratio n of $SiO_2/Na_2O$ is $1.20 \leq n \leq 1.60$ can be produced, for example, by heat fusing $SiO_2$, and sodium carbonate or sodium hydroxide, and then cooling the fused matter.

As the raw material $SiO_2$, known materials containing $SiO_2$ as a main component such as quartzite, siliceous sand, cristobalite, fused silica, amorphous silica and silica sol can be used without any limitation. Industrially, siliceous sand is preferably used in view of its cheapness and easy handling. The other material sodium carbonate or sodium hydroxide can be used alone, or can be used as a mixture at any ratio.

These raw materials are heat fused. As conditions such as temperature, time, etc. at that time, any condition can be adopted so long as the raw materials are fused and fused matter of sodium silicate is formed. A preferred temperature condition therefor is 1,100° to 1,400° C. in view of the alkali resistance of the furnace wall and economical efficiency, and it is economically preferred that the heat fusing time is short, and sufficiently uniform fused matter of sodium silicate is formed in 10 hours or less.

As to the cooling method for the sodium silicate fused matter, it is sufficient if the cooling is carried out under such a condition that sodium silicate cullet formed is amorphous. In general, such cooling that it is taken out from the fusion state into the environment of room temperature is sufficient. The cooling can be carried out not only by mere air cooling, but by water cooling or the like. When the cooling rate is enlarged by a method such as water cooling, the ratio of fine crystals can be decreased, and it is possible to make the cullet more perfectly amorphous, which is preferred.

Amorphous sodium silicate cullet obtained by the cooling is ground so that the molar ratio n and the specific surface area S may satisfy the above-mentioned value ranges and the above-mentioned relation. The grinding can be carried out according to a known grinding method. For example, there can be used pulverizers such as ball mills, agitation mills, high speed revolution pulverizers, jet mills, shearing mills and colloid mills. Among them, ball mills can be mentioned as the most general grinder. As specific examples thereof, there can be mentioned rolling mills such as pot mills, tube mills and conical mills; vibrating ball mills such as circular vibrating mills and gyratory vibrating mills; centrifugal ball mills; planetary mills; etc.

Further, in order to increase the efficiency of grinding by the above pulverizer, it is preferred to grind or crush the cullet into grains of the order of several mm, before the pulverization operation, using a grinder or crusher such as a jaw crusher, a gyratory crusher, a cone crusher or a hammer crusher.

The amorphous sodium silicate powder of the present invention, wherein the molar ratio n of $SiO_2/Na_2O$ and the specific surface area S satisfy the specific value ranges and relation, exhibits excellent water softening power. Further, since its production is carried out by merely pulverizing amorphous sodium silicate cullet having the specific molar ratio n, it is possible to simplify production process for amorphous sodium silicate powder suitable as a builder.

The present invention is further detailedly described below by examples and comparative examples, but not limited to these examples. The measured values in the examples and comparative examples were measured according to the following methods.

(1) Amount and particle size of fine crystals contained in amorphous sodium silicate powder When, in the X-ray diffraction pattern of the amorphous sodium silicate powder of the present invention, a broad peak is observed around $2\theta=33°$, as shown in FIG. 2, it is possible to calculate the amount of fine crystals from the area of the broad peak and the particle size of the fine crystals from its half width. This broad peak is bent from the halo pattern around $2\theta=27°$ and around $2\theta=38°$. The integrated intensity of the broad peak (this value is referred to as $NI_B$) by connecting the two bending points by a straight line and using the straight line as a background. Further at the same time, the half width D (unit:radian) and the peak position $2\theta_p$ (unit:°) of the broad peak were measured. On the other hand, the integrated intensity of the whole pattern (this value is referred to as $NI_T$) was calculated by connecting the point at $2\theta=8°$ and the point at $2\theta=125°$ by a straight line and using the straight line as a background. The amount of the fine crystals was calculated using the above values, and the particle size of the fine crystals was calculated from the Scherrer's expression.

Amount of fine crystals (% by volume)= $(NI_B/NI_T) \times 100$

Particle size of fine crystals= $(K \times \lambda)/(D \times \cos\theta_p)$ wherein K=0.94, and λ, which is the wavelength of X-ray, is 0.154056 nm.

(2) Molar ratio n of amorphous sodium silicate powder

Amorphous sodium silicate powder was completely dissolved in water, the amount of sodium oxide and the amount of silica in the the aqueous solution were measured, respectively, and the molar ratio n was calculated from the ratio.

Sodium oxide amount: This was measured by neutralization titrating a sample with hydrochloric acid using a Methyl Orange solution as an indicator.

Silica amount: A sample was reacted with sodium fluoride, as shown in the following expression, and sodium hydroxide released was neutralization titrated with hydrochloric acid. The silica amount was calculated by subtracting the sodium oxide amount measured by the above method, from the amount of hydrochloric acid consumed.

$H_2SiO_3 + 6NaF + H_2O \rightarrow Na_2SiF_6 + 4NaOH$ (4 mol of sodium hydroxide is formed per mol of silica)

(3) Specific surface area of amorphous sodium silicate powder

Measured using the air permeametric method. Specifically, the specific surface area Sw was calculated by the following Kozeny-Carman's expression.

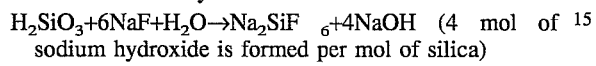

wherein $\epsilon$: Fractional voids of the sample packing layer: $\epsilon = 1 - W/(\rho \times A \times L)$ $\rho$: Density of the powder (g/cm$^3$)

$\eta$: Viscosity coefficient of air (mPa sec)

L: Thickness of the sample layer (cm)

Q: Amount of air permeating the sample layer (cm$^3$)

$\Delta P$: Pressure difference at both ends of the sample layer (g/cm$^2$)

A: Cross section of the sample layer (cm$^2$)

t: Time required for Q cm$^3$ of air to permeate the sample layer (sec)

W: Weight of the sample (g)

Herein L is 1.2 cm, Q is 20 cm$^3$, $\Delta P$ is 10 g/cm$^2$, A is 2 cm$^2$, $\rho$ is true specific gravity, and $\eta$ is 0.0182 mN sec m$^{-2}$ (=mPa sec) [value at 1 atm and 20° C. described in LANGE'S HANDBOOK CHEMISTRY, 12th Edition, Chapter 10, page 100], and therefore, the specific surface area Sw can be calculated by measuring W and t.

(4) Water softening power (Calcium binding capacity)

The water softening power of amorphous sodium silicate powder was represented by calcium binding capacity. 1 L of 5 mmol/L aqueous calcium chloride solution adjusted to pH 10 with ethanolamine and hydrochloric acid was adjusted to a constant temperature of 20° C. under stirring at 350 r.p.m. About 0.2 g of amorphous sodium silicate powder as a sample was accurately weighed out (unit:g), and added to the above solution. After stirring the mixture at 350 r.p.m. for 15 minutes, ml thereof was taken as a sample and filtered with a filter of 0.2 μm. The Ca concentration in the resultant solution was measured by an Inductive Coupled Plasma Atomic Emission Spectrometer (TCP-AES), and the Ca ion amount C (unit: mg) was calculated from the value. The calcium binding capacity was calculated by the following expression.

Calcium binding capacity = (20−C)/0.2 (unit: mg/g sample)

Example 1

177 g of siliceous sand (SiO$_2$=99.8%) and 223 g of sodium carbonate (Na$_2$CO$_3$=99%) were mixed, and 100 g of water was added, followed by mixing. The mixture was put in a platinum-made crucible, the temperature of the mixture was elevated from room temperature to 1300° C. in 1.5 hours in an electric furnace, and the mixture was held at 1300° C. for 5 hours. After the heat fusing, the crucible containing the ignited contents was taken out from the electric furnace, and quenched by immersing it in a water bath to give colorless transparent sodium silicate cullet. The sodium silicate cullet was crushed by a jaw crusher (clearance 5 mm). The crushed cullet was then ground with a ball mill (pot; inner diameter 135 mm, capacity 2 L, ball ; diameter 30 mm, 33 balls, made of Al$_2$O$_3$) at a revolution speed of 60 r.p.m. for 23 hours.

The crystallinity of the resultant amorphous sodium silicate powder was evaluated by X-ray diffraction, and as a result a halo pattern as shown in FIG. 2 was obtained. A broad peak was observed around 2θ=33°, and the amount of fine crystals calculated from the area of the broad peak in the halo pattern in comparison with the halo pattern, was 13% by volume, and the particle size of the fine crystals calculated from the half width of the broad peak was 1.6 nm. The physical properties of this amorphous sodium silicate powder were shown together in Table 1.

Example 2

Colorless transparent sodium silicate cullet was obtained in the same manner as in Example 1. The sodium silicate cullet was crushed by a jaw crusher (clearance 5 mm). The crushed cullet was then ground with the same ball mill that was used in Example 1, at a revolution speed of 60 r.p.m. for 1 hour. Triethanolamine was then added in an amount of 0.15 wt % of the sodium silicate powder, and the mixture was ground under the same conditions for 22 hours.

As to the resultant amorphous sodium silicate powder, the amount of fine crystals calculated from the area of the broad peak in the halo pattern in comparison with the halo pattern, was 13% by volume, and the particle size of the fine crystals calculated from the half width of the broad peak was 1.6 nm. The physical properties of this amorphous sodium silicate powder were shown together in Table 1.

Examples 3 and 4

Amorphous sodium silicate powders were obtained in the same manner as in Example 1 except that the charges of siliceous sand and sodium carbonate and grinding time by the ball mill were changed. The physical properties thereof were shown in Table 1. Further, the amounts of fine crystals calculated from the area of the broad peak in the halo pattern in comparison with the halo pattern, were 14% by volume as to the powder of Example 3, and 13% by volume as to the powder of Example 4, and the particle sizes of the fine crystals calculated from the half widths of the broad peaks were 1.6 nm in both powder of Example 3 and powder of Example 4.

Example 5

Amorphous sodium silicate powder was obtained in the same manner as in Example 2 except that the charges of siliceous sand and sodium carbonate and grinding time by the ball mill were changed. The physical properties thereof were shown in Table 1. As to this powder, the amount of fine crystals calculated from the area of the broad peak in the halo pattern in comparison with the halo pattern, was 8% by volume, and the particle size of the fine crystals calculated from the half width of the broad peak was 1.6 nm.

Example 6

Amorphous sodium silicate powder was obtained in the same manner as in Example 1 except that the heat fusing temperature was maintained at 1100° C. The physical properties thereof were shown in Table 1. As to this powder, the amount of fine crystals calculated from the area of the broad peak in the halo pattern in comparison with the halo pattern, was 8% by volume, and the particle size of the fine crystals calculated from the half width of the broad peak was 2.0 nm.

Examples 7 to 9

Amorphous sodium silicate powders were obtained in the same manner as in Example 1 or Example 2 except that the charges of siliceous sand and sodium carbonate and grinding time by the ball mill were changed. The physical properties thereof were shown in Table 1. As to these powders, the amounts of fine crystals calculated from the area of the broad peak in the halo pattern in comparison with the halo pattern, were 13% by volume as to example 7, 8% by volume as to example 8 and 7% by volume as to example 9, and the particle sizes of the fine crystals calculated from the half widths of the broad peaks were 1.6 nm as to Example 7, 1.6 nm as to Example 8 and 1.8 nm as to Example 9.

Comparative Examples 1 to 4

Amorphous sodium silicate powders were obtained in the same manner as in Example 1 except that the charges of siliceous sand and sodium carbonate as raw materials were changed. The physical properties thereof were shown in Table 1. As to these powders, the amounts of fine crystals calculated from the area of the broad peak in the halo pattern in comparison with the halo pattern, were 8 to 16% by volume, and the particle size of the fine crystals calculated from the half widths of the broad peaks were 1.6 to 1.8 nm.

Comparative Example 5

Colorless transparent sodium silicate cullet was obtained in the same manner as in Example 1 except that the charges of siliceous sand and sodium carbonate as raw materials were changed. The sodium silicate cullet was crushed by a jaw crusher (clearance 5 mm). The crushed cullet was then ground with the same ball mill that was used in Example 1, at a revolution speed of 60 r.p.m. for 120 minutes. Finally, the powder obtained by the grinding was passed through a sieve of 100 meshes, and as a result, 91% by weight thereof was passed. The physical properties of the resultant amorphous sodium silicate powder were shown together in Table 1.

Comparative Example 6

Colorless transparent sodium silicate cullet was obtained in the same manner as in Example 1 except that the charges of siliceous sand and sodium carbonate as raw materials were changed. The sodium silicate cullet was crushed by a jaw crusher (clearance 5 mm). The crushed cullet was then ground with the same ball mill that was used in Example 1, at a revolution speed of 60 r.p.m. for 100 minutes. Finally, the powder obtained by the grinding was passed through a sieve of 65 meshes, and as a result, 100% by weight thereof was passed. The physical properties of the resultant amorphous sodium silicate powder were shown together in Table 1.

TABLE 1

| | Fusing temperature (°C.) | Addition amount of TEA*[1] at the time of grinding (wt %) | Molar ratio | Specific surface area | | | Average primary particle size*[2] (μm) | Average secondary particle size*[3] (μm) | Ca binding capacity (mgCa/g) |
|---|---|---|---|---|---|---|---|---|---|
| | | | | Measured value (m²/g) | Lower limit (m²/g) | Upper limit (m²/g) | | | |
| Example 1 | 1300 | 0 | 1.40 | 0.35 | 0.14 | 0.90 | 6.9 | 12 | 51 |
| Example 2 | 1300 | 0.15 | 1.40 | 0.39 | 0.14 | 0.90 | 6.2 | 11 | 54 |
| Example 3 | 1300 | 0 | 1.30 | 0.23 | 0.10 | 0.53 | 10.4 | 20 | 44 |
| Example 4 | 1300 | 0 | 1.40 | 0.24 | 0.14 | 0.90 | 10.0 | 19 | 47 |
| Example 5 | 1300 | 0.15 | 1.50 | 0.65 | 0.26 | 0.90 | 3.7 | 7 | 45 |
| Example 6 | 1100 | 0 | 1.40 | 0.27 | 0.14 | 0.90 | 8.9 | 14 | 44 |
| Example 7 | 1300 | 0.30 | 1.40 | 0.70 | 0.14 | 0.90 | 3.4 | 7 | 54 |
| Example 8 | 1300 | 0 | 1.50 | 0.31 | 0.26 | 0.90 | 7.7 | 15 | 34 |
| Example 9 | 1300 | 0 | 1.60 | 0.74 | 0.46 | 0.90 | 3.2 | 6 | 34 |
| Comparative example 1 | 1300 | 0 | 1.19 | 0.13 | — | — | 18.5 | 35 | 11 |
| Comparative example 2 | 1300 | 0 | 1.50 | 0.20 | 0.26 | 0.90 | 12.0 | 22 | 26 |
| Comparative example 3 | 1300 | 0 | 1.60 | 0.31 | 0.46 | 0.90 | 7.7 | 13 | 19 |
| Comparative example 4 | 1300 | 0 | 1.70 | 0.37 | — | — | 6.5 | 11 | 11 |
| Comparative example 5 | 1300 | 0 | 2.00 | 0.08 | — | — | 30.0 | 55 | 4.4 |
| Comparative example 6 | 1300 | 0 | 2.40 | 0.06 | — | — | 40.0 | 76 | 1.5 |

*[1]TEA means triethanolamine.
*[2]Average primary particle size is a value obtained from the value of specific surface area according to the sphere approximate calculation.
*[3]Average secondary particle size is a value measured by a particle size distribution analyzer.

What is claimed is:

1. Amorphous sodium silicate powder wherein, when the molar ratio of $SiO_2/Na_2O$ is expressed by n and the specific surface area thereof is expressed by $S(m^2/g)$, the following expressions:

$1.20 \leq n \leq 1.60$ $0.10 \leq S \leq 0.90$ and $0.008 \times n^{8.6} \leq S \leq 0.063 \times n^{8.1}$ are satisfied.

2. The amorphous sodium silicate powder according to claim 1 wherein, when the molar ratio of $SiO_2/Na_2O$ is expressed by n, the following expression:

$1.30 \leq n \leq 1.50$ is satisfied.

3. The amorphous sodium silicate powder according to claim 1 wherein, when the specific surface area is expressed by $S(m^2/g)$, the following expression:

$0.20 \leq S \leq 0.80$ is satisfied.

4. The amorphous sodium silicate powder according to claim 1 wherein, when the molar ratio of $SiO_2/Na_2O$ is expressed by n and the specific surface area thereof is expressed by $S(m^2/g)$, the following expression:

$0.008 \times n^{9.6} \leq S \leq 0.045 \times n^{8.2}$ is satisfied.

5. The amorphous sodium silicate powder according to claim 1 wherein, when the molar ratio of $SiO_2/Na_2O$ is expressed by n and the specific surface area thereof is expressed by $S(m^2/g)$, the following expression:

$0.009 \times n^{9.7} \leq S \leq 0.037 \times n^{8.3}$ is satisfied.

6. The amorphous sodium silicate powder according to claim 1 wherein the amount of fine crystals thereof, calculated from the area of the broad peak in the X-ray diffraction halo pattern in comparison with the halo pattern, is 20% by volume or less.

7. The amorphous sodium silicate powder according to claim 1 wherein its average primary particle size is 2.7 to 24 μm.

8. The amorphous sodium silicate powder according to claim 1 wherein its average secondary particle size is 4.5 to 45 μm.

9. The amorphous sodium silicate powder according to claim 1 wherein its average secondary particle size is 5.2 to 22 μm.

10. A detergent builder comprising the amorphous sodium silicate powder according to any of claims 1 to 9.

* * * * *